United States Patent
Kumar et al.

(10) Patent No.: US 10,084,703 B2
(45) Date of Patent: Sep. 25, 2018

(54) INFRASTRUCTURE-EXCLUSIVE SERVICE FORWARDING

(71) Applicant: CISCO TECHNOLOGY, INC., San Jose, CA (US)

(72) Inventors: Surendra M. Kumar, San Ramon, CA (US); Hendrikus G. P. Bosch, Aalsmeer (NL); Kent K. Leung, Palo Alto, CA (US); Abhijit Patra, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 88 days.

(21) Appl. No.: 15/143,253

(22) Filed: Apr. 29, 2016

(65) Prior Publication Data

US 2017/0163531 A1    Jun. 8, 2017

Related U.S. Application Data

(60) Provisional application No. 62/263,422, filed on Dec. 4, 2015.

(51) Int. Cl.
*H04L 12/741* (2013.01)
*H04L 12/935* (2013.01)
(Continued)

(52) U.S. Cl.
CPC .............. *H04L 45/74* (2013.01); *H04L 45/00* (2013.01); *H04L 45/7453* (2013.01); *H04L 49/3009* (2013.01)

(58) Field of Classification Search
None
See application file for complete search history.

(56) References Cited

U.S. PATENT DOCUMENTS

| 5,812,773 A | 9/1998 | Norin |
| 5,889,896 A | 3/1999 | Meshinsky et al. |

(Continued)

FOREIGN PATENT DOCUMENTS

| CN | 101719930 | 6/2010 |
| CN | 101394360 | 7/2011 |

(Continued)

OTHER PUBLICATIONS

"Network Service Header", Internet Engineering Task Force Draft, Published Jul. 3, 2014.*

(Continued)

*Primary Examiner* — James P Duffy
(74) *Attorney, Agent, or Firm* — Polsinelli PC

(57) ABSTRACT

A method is provided in one example embodiment and includes receiving at a network element a packet including a Network Services Header ("NSH"), in which the NSH includes an Infrastructure ("I") flag and a service path header comprising a Service Index ("SI"), and a Service Path ID ("SPI") and determining whether the I flag is set to a first value. The method further includes, if the I flag is set to the first value, setting the I flag to a second value and forwarding the packet to the service function that corresponds to the SI for processing. The method still further includes, if the I flag is not set to the first value, decrementing the SI and making a forwarding decision based on a new value of the SI and the SPI.

20 Claims, 7 Drawing Sheets

(51) Int. Cl.
  *H04L 12/743*   (2013.01)
  *H04L 12/701*   (2013.01)

(56) References Cited

U.S. PATENT DOCUMENTS

| | | |
|---|---|---|
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Iyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 * | 7/2013 | Ahn .................. H04L 63/0227 726/11 |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |

(56) References Cited

U.S. PATENT DOCUMENTS

| | | |
|---|---|---|
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Puller et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu, Sr. |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |

(56) References Cited

U.S. PATENT DOCUMENTS

| | | |
|---|---|---|
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorensen, III et al. |
| 2014/0310417 A1 | 10/2014 | Sorensen, III et al. |
| 2014/0310418 A1 | 10/2014 | Sorensen, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1* | 11/2014 | Guichard ............ H04L 45/306 370/392 |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | LaRoche et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0171158 A1 | 6/2017 | Hoy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Kumar, S., et al., "Infrastructure Service Forwarding for NSH,"Service Function Chaining Internet Draft, draft-kumar-sfc-nsh-forwarding-00, Dec. 5, 2015, 10 pages.

Quinn, P., et al., "Service Function Chaining (SFC) Architecture," Network Working Group, Internet Draft, draft-quinn-sfc-arch-03.txt, Jan. 22, 2014, 21 pages.

PCT Mar. 7, 2017 International Search Report and Written Opinion of the International Searching Authority from International Application Serial No. PCT/US2016/064017; 10 pages.

Amedro, Brian, et al., "An Efficient Framework for Running Applications on Clusters, Grids and Cloud," 2010, 17 pages.

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

(56) References Cited

OTHER PUBLICATIONS

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data:: Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.ora/doc/openvz-intro.pdf.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.

(56) References Cited

OTHER PUBLICATIONS

Sun, Aobing, et al., "IaaS Public Cloud Computing Platform Scheduling Model and Optimization Analysis," Int. J. Communications, Network and System Sciences, 2011, 4, 803-811, 9 pages.

Szymaniak, Michal, et al., "Latency-Driven Replica Placement", vol. 47 No. 8, IPSJ Journal, Aug. 2006, 12 pages.

Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.

Wikipedia, "Filter (software)", Wikipedia, Feb. 8, 2014, 2 pages, https://en.wikipedia.org/w/index.php?title=Filter_%28software%29&oldid=594544359.

Wikipedia; "Pipeline (Unix)", Wikipedia, May 4, 2014, 4 pages, https://en.wikipedia.org/w/index.php?title=Pipeline2/028Unix%29&oldid=606980114.

Ye, Xianglong, et al., "A Novel Blocks Placement Strategy for Hadoop," 2012 IEEE/ACTS 11th International Conference on Computer and Information Science, 2012 IEEE, 5 pages.

\* cited by examiner

INFRASTRUCTURE-EXCLUSIVE SERVICE FORWARDING

CROSS-REFERENCE TO RELATED APPLICATION

This application claims the benefit of priority under 35 U.S.C. § 119(e) to U.S. Provisional Application Ser. No. 62/263,422 entitled "METHOD FOR INFRASTRUCTURE-EXCLUSIVE SERVICE FORWARDING" filed Dec. 4, 2015, which is hereby incorporated by reference in its entirety.

TECHNICAL FIELD

This disclosure relates in general to the field of communications networks and, more particularly, to a technique for performing infrastructure-exclusive service forwarding in such communications networks.

BACKGROUND

The delivery of end-to-end services in a communications network often requires the performance of a variety of service functions. Such service functions may include, but are not limited to, firewalls and traditional IP Network Address Translators ("NATs"), as well as application-specific functions. The definition and instantiation of an ordered set of service functions and the subsequent steering of traffic through those functions is referred to as service function chaining ("SFC"), or simply service chaining. In the process, the traffic is serviced as per policy in the service functions and the service chaining infrastructure. Existing methods of forwarding traffic through service functions suffer from various deficiencies, including but not limited to, complexity of deployment and operation due to a large number of forwarding touch points; scale challenges due to the involvement of service functions in making forwarding decisions, and violation of operational environment policies due to errors or unintentional modification of forwarding state by service functions.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1A:
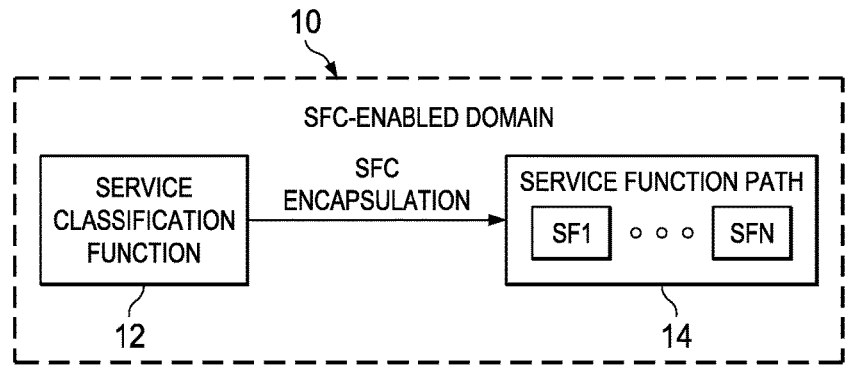
FIG. 1A is an SFC-enabled domain, which may include an initial classification function as an entry point into a service function path, in accordance with embodiments described herein.

A method is provided in one example embodiment and includes receiving at a network element a packet including a Network Services Header ("NSH"), wherein the NSH includes an Infrastructure ("I") flag and a service path header comprising a Service Index ("SI"), and a Service Path ID ("SPI") and determining whether the I flag is set to a first value. The method further includes, if the I flag is set to the first value, setting the I flag to a second value and forwarding the packet to the service function that corresponds to the SI for processing. The method still further includes, if the I flag is not set to the first value, decrementing the SI and making a forwarding decision based on a new value of the SI and the SPI.

Example Embodiments

To accommodate agile networking and flexible provisioning of network nodes in a network, service chaining may be used to ensure an ordered set of service functions are applied to packets and/or frames of a traffic flow. Service chaining provides a method for deploying service functions in a manner that enables dynamic ordering and topological independence of the service functions. A service chain may define an ordered set of service functions to be applied to packets and/or frames of a traffic flow, where each service function of the ordered set is selected as a result of classification. The implied order may not be a linear progression, as the architecture may allow for nodes that copy to more than one branch.

Service chaining involves a classifier function that performs classification based on policies configured by a control plane element to select a service chain to process traffic and load balances the traffic among instances of the selected service chain. Once the classifier function selects a service chain instance (a.k.a. service function path or "SFP"), it forwards the traffic along a service function path ("SFP"), or simply, a service path, through one or more service-aware forwarding elements ("FEs"). In one certain embodiment, each forwarding element implements a service function forwarder ("SFF") capability described in an IETF draft entitled "Service Function Chaining (SFC) Architecture" (IETF RFC7665—https://datatracker.ietf.org/doc/rfc7665/) (hereinafter "SFC Architecture RFC"). The forwarding elements forward the traffic to the actual service functions that are logically anchored to, and/or instantiated on, the forwarding element. Forwarding of traffic between any two components in such an architecture, and hence along the service chains, is performed over an overlay network. Overlay networks are realized via a transport header and an encapsulation header. Various network encapsulation headers have been employed to forward traffic, requiring service through the service chains. Such network encapsulation headers encapsulate the original packet, or frame, and are themselves encapsulated in an overlay transport protocol. Examples of encapsulation headers include proprietary headers, such as vPath, or proposed IETF standard headers, such as Network Service Header ("NSH"). Transport protocols used to carry such encapsulated packets may be L3- or L4-based, such as IPv4/IPv6 or GRE or UDP, VxLAN, etc. In the case of vPath, even L2-based, such as LLC SNAP.

FIG. 1A illustrates an SFC-enabled domain 10, which may include an initial service classification function (or "classifier") 12, as an entry point to a service path. The initial service classification function 12 prescribes an instance of the service path, designated in FIG. 1A by a reference numeral 14, and encapsulates a packet or frame with service path information that identifies the service path. The classification function 12 may potentially add metadata, or shared context to the SFC encapsulation part of the packet or frame. The service path 14 may include a plurality of service functions, designated in FIG. 1A by SF1, SF2, . . . , SFN.

A service function may be responsible for specific treatment and/or processing of received packets. A service function may act at the network layer or other OSI layers (e.g., application layer, presentation layer, session layer, transport layer, data link layer, and physical link layer). A service function may be a virtual instance or be embedded in a physical network element, such as a service node. When a service function or other modules of a service node are executed by the at least one processor of the service node, the service function or other modules may be configured to implement any one of the methods described herein. Multiple service functions can be embedded in the same network element. Multiple instances of the service function can be enabled in the same administrative SFC-enabled domain. A non-exhaustive list of service functions includes firewalls, WAN and application acceleration, Deep Packet Inspection ("DPI"), server load balancers, NAT44, NAT64, HOST_ID injection, HTTP Header Enrichment functions, TCP optimizer, and others. A service function may be SFC-encapsulation aware; that is, it may receive and act on information in the SFC encapsulation, or unaware in which case data forwarded to the service does not contain the SFC encapsulation.

A service node may be a physical network element (or a virtual element embedded on a physical network element) that hosts one or more service functions and may have one or more network locators associated with it for reachability and service delivery. In many standardization documents, "service functions" can refer to the service nodes described herein as having one or more service functions hosted thereon. SFP, or simply service path, relates to the instantiation of a service chain in a network. Packets follow a service path from a classifier through the requisite service functions.

Figure 1B:
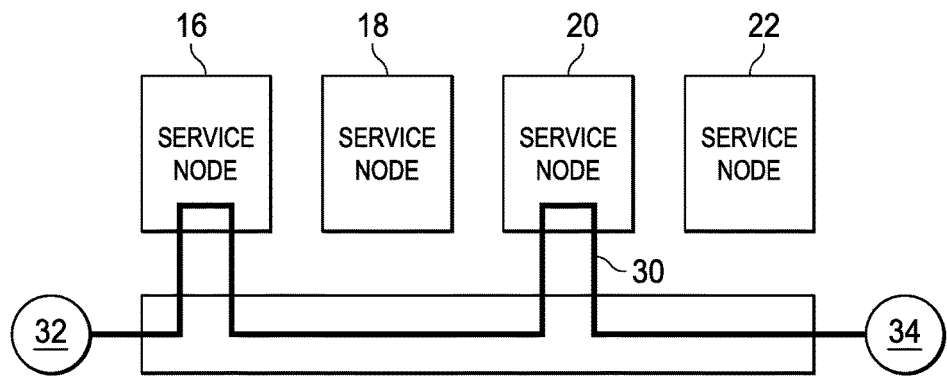
FIG. 1B illustrates a simplified block diagram of a service function chain, which may include an initial classification function as an entry point into a service function path, in accordance with embodiments described herein.
Figure 1C:
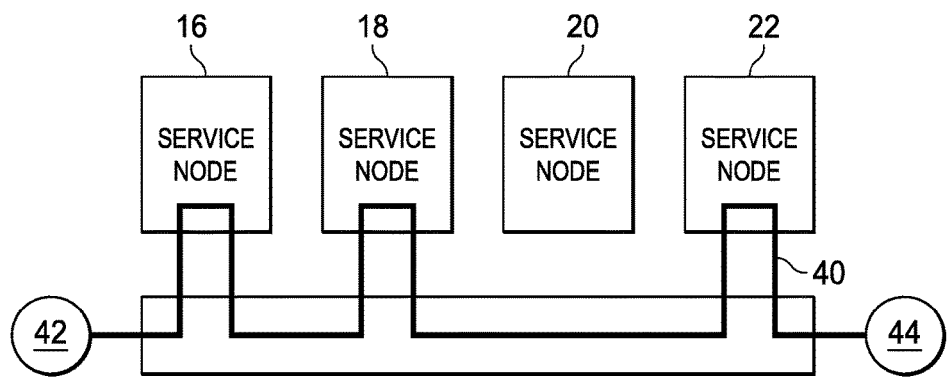
FIG. 1C illustrates a simplified block diagram of another service function chain, which may include an initial classification function as an entry point into a service function path, in accordance with embodiments described herein.

FIGS. 1B-1C illustrate different service paths that may be realized using service function chaining. These service paths may be implemented by encapsulating packets of a traffic flow with a network service header ("NSH") or some other suitable packet header which specifies a desired service path (e.g., by identifying a particular service path using service path information in the NSH) through one or more of service nodes 16, 18, 20, and 22. In the example shown in FIG. 1B, a service path 30 may be provided between an endpoint 32 and an endpoint 34 through service node 16 and service node 20. In the example shown in FIG. 1C, a service path 40 (a different instantiation) can be provided between end point 42 and endpoint 44 through service node 16, service node 18, and service node 22.

Generally speaking, an NSH includes service path information, and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier ("SCL") or some other suitable SFC-aware network element can process packets or frames of a traffic flow and performs NSH encapsulation according to a desired policy for the traffic flow.

Figure 2A:
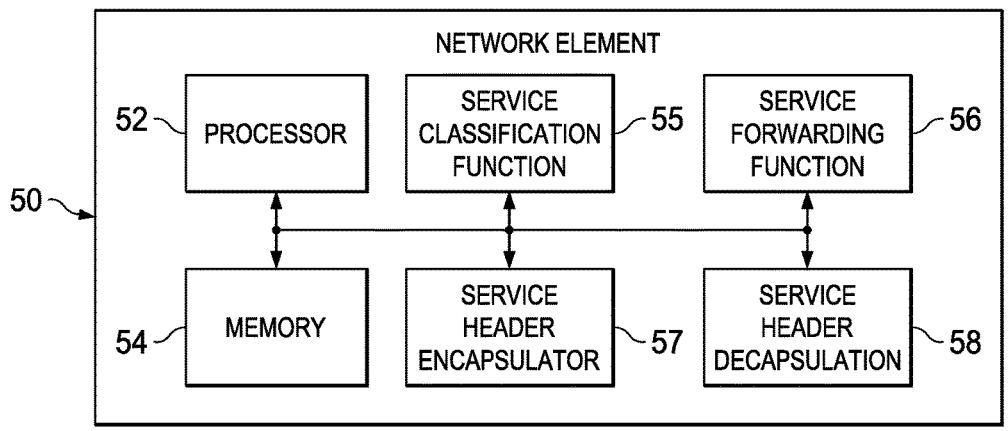
FIG. 2A is a simplified block diagram of a first type of service function chain-aware network element for prescribing a service path of a traffic flow in accordance with embodiments described herein.

FIG. 2A shows a system view of SFC-aware network element 50, e.g., such as an initial service classifier, for prescribing a service path of a traffic flow, according to some embodiments of the disclosure. Network element 50 includes processor 52 and (computer-readable non-transitory) memory 54 for storing data and instructions. Furthermore, network element 50 may include a service classification function 55, a service forwarding function 56, a service header encapsulator 57, and a service header decapsulator 58, all of which may be provided by processor 52 when processor 52 executes the instructions stored in memory 54. Service forwarding function 55 determines how to forward service encapsulated packets at a classifier or a forwarding network element. It also determines whether to remove or modify the service encapsulation header received. The latter is true if the network element is acting as a service forwarder as opposed to a classifier. In general, a classifier needs a service forwarding function alongside it, whereas a service forwarding function does not necessarily need a classifier.

The service classification function 55 can process a packet of a traffic flow and determine whether the packet requires servicing and correspondingly which service path to follow to apply the appropriate service. The determination can be performed based on business policies and/or rules stored in memory 54. Once the determination of the service path is made, service header encapsulator 57 generates an appropriate NSH having identification information for the service path and adds the NSH to the packet. The service header encapsulator 57 provides an outer encapsulation to forward the packet to the start of the service path. Other SFC-aware network elements are thus able to process the NSH while other non-SFC-aware network elements would simply forward the encapsulated packets as is. Besides inserting an NSH, network element 50 can also remove or not add the NSH if the service classification function 55 determines the packet does not require servicing.

Figure 2B:
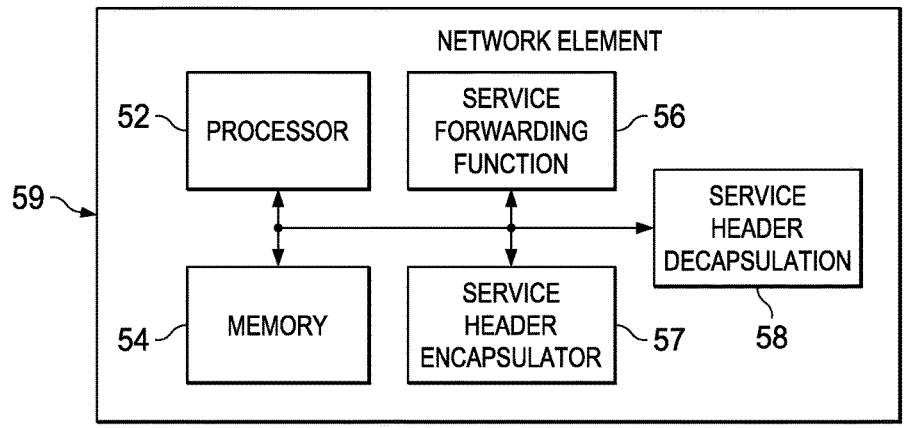
FIG. 2B is a simplified block diagram of a second type of service chain function-aware network element for forwarding a traffic flow as prescribed in accordance with embodiments described herein.

FIG. 2B shows a system view of an SFC-aware network element 58, e.g., such as an SFF, for forwarding service flows to service functions and to other SFFs as prescribed, according to some embodiments of the disclosure. Network element 58 is identical in all respects to network element 50 except that network element 58 does not include service classification function 55.

An NSH may include a (e.g., 64-bit) base header, and one or more context headers. Generally speaking, the base header provides information about the service header and service path identification (e.g., an SPI), and context headers may carry opaque metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location (i.e., service function) within a path. The variable length context headers can carry opaque metadata and variable length encoded information. The one or more optional context headers make up a context header section in the NSH. For instance, the context header section can include one or more context header fields having pieces of information therein, describing the packet/frame. Based on the information in the base header, a service function of a service node can, for instance, derive policy selection from the NSH. Context headers shared in the NSH can, for instance, provide a range of service-relevant information such as traffic classification, end point identification, etc. Service functions can use NSH to select local service policy.

Figure 3:
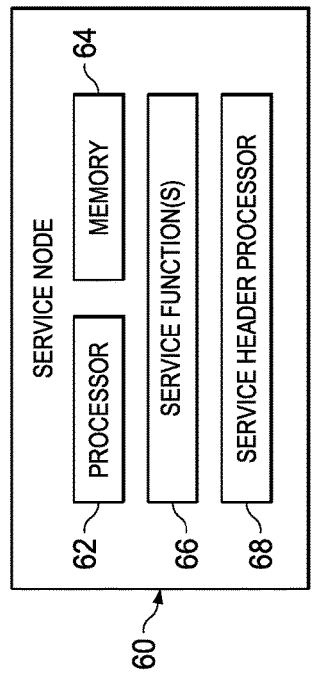
FIG. 3 is a simplified block diagram of a service node in accordance with embodiments described herein.

Once properly classified and encapsulated by the classifier, the packet having the NSH may be then forwarded to one or more service nodes where service(s) can be applied to the packet/frame. FIG. 3 shows a system view of a service node, according to some embodiments of the disclosure. Service node 60, generally a network element, can include processor 62 and (computer-readable non-transitory) memory 64 for storing data and instructions. Furthermore, service node 60 may include service function(s) 66 (e.g., for applying service(s) to the packet/frame, classifying the packet/frame) and service header processor 68. The service functions(s) 66 and service header processor 68 can be provided by processor 62 when processor 62 executes the instructions stored in memory 64. Service header processor 68 can extract the NSH, and in some cases, update the NSH as needed. For instance, the service header processor 68 can decrement the service index. If the resulting service index=0, the packet is dropped. In another instance, the service header processor 68 or some other suitable module provide by the service node can update context header fields if new/updated context is available.

As previously noted, service chaining involves a classifier function performing classification based on policies configured by a control plane to select service chains and perform load balancing among instances of the service chains. The classifier function then forwards the traffic along the SFP through one or more service-aware forwarding elements. Forwarding elements implement a service function forwarder ("SFF") capability described in the aforementioned SFC Architecture IETF Draft. The forwarding elements forward the traffic to the actual service chain nodes that are logically anchored to the forwarding element. Forwarding of traffic between any two components in such an architecture, and hence through the service chains, is performed over an overlay network. As previously noted, overlay networks are realized via a transport header and an encapsulation header. Various network encapsulation headers have been employed to forward traffic, requiring service through the service chains. Such headers encapsulate the original packet, or frame, and are themselves encapsulated in an overlay transport protocol. Examples of encapsulation headers include proprietary headers such as vPath or proposed IETF standard headers, such as Network Service Header ("NSH"). The transport protocols used to carry such encapsulations are typically L3 or L4 based, such as IPv4/IPv6 or GRE or UDP, VxLAN, etc. In the case of vPath, even L2 protocols, such as LLC SNAP, may be used.

By way of an example, a service chain $SC_1$ may be described in terms of service function ("SF") types:

$SC_1 = SF_a, SF_b, SF_c$

Corresponding service chain instances, i.e., the service paths ("SPs"), may be constructed from instances of the service function type:

$SP_{1.1} = SF_{a1}, SF_{b1}, SF_{c1}$
$SP_{1.2} = SF_{a1}, SF_{b3}, SF_{c2}$

Figure 4:
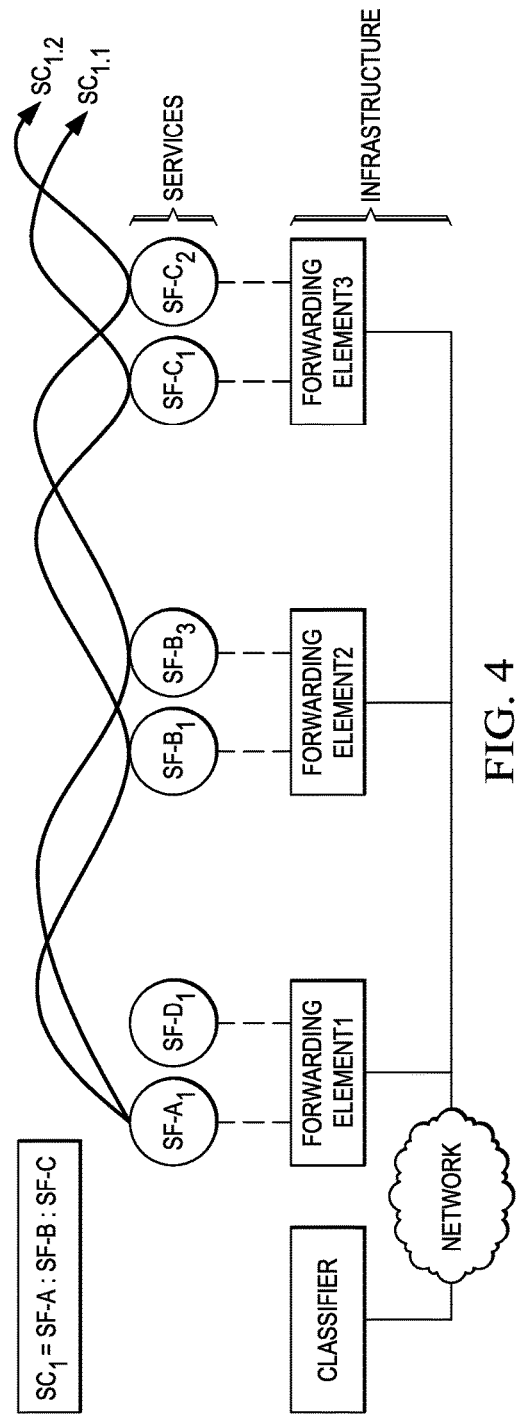
FIG. 4 illustrates two example service paths in accordance with embodiments described herein.
Figure 5:
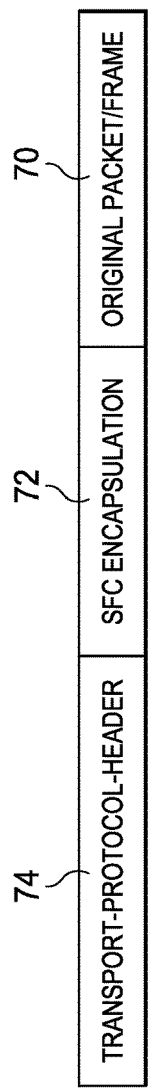
FIG. 5 illustrates an example packet structure in accordance with embodiments described herein.

As illustrated in FIG. 4, service chain SC1 maps to two service paths SP1.1 and SP1.2. Classifier selects the service chain SC1 and load balances between instances SP1.1 and SP1.2. In general, packets forwarded between the components, such as, between classifier and forwarding element or forwarding element and service function, is of the form illustrated in FIG. 5 and include an original packet/frame 70, SFC encapsulation 72, and a transport protocol header 74. The SFC encapsulation 72 may be implemented using an NSH. As previously noted, NSH includes a base header, a service header, and a fixed/variable number of metadata TLVs as described in IETF draft entitled "Network Service Header" (draft-ietf-sfc-nsh-01.txt) (hereinafter "NSH IETF Draft").

Figure 6:
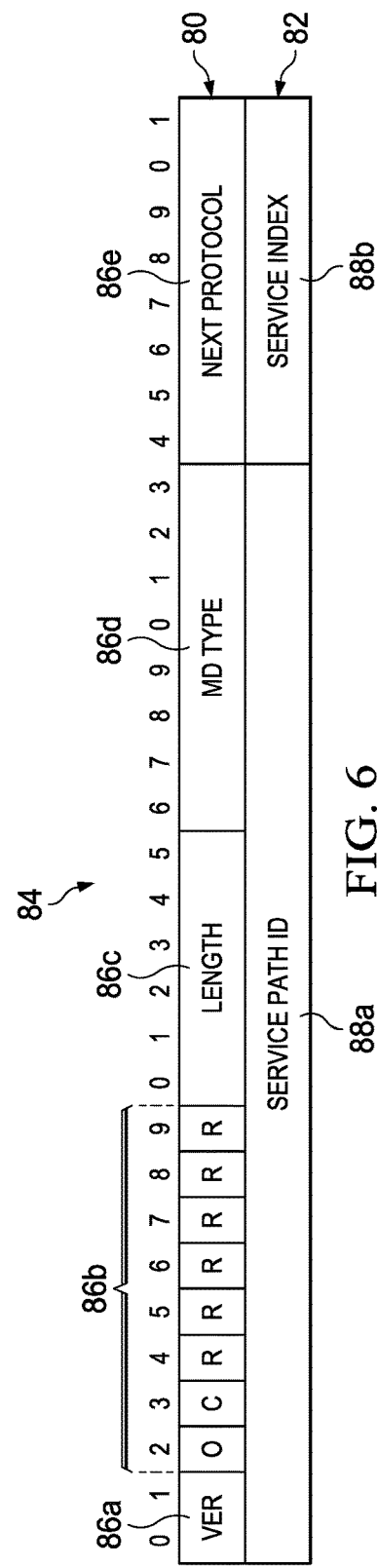
FIG. 6 illustrates an example arrangement of base and service headers in accordance with embodiments described herein.

FIG. 6 shows the format of a base header 80 and a service header 82 of a conventional NSH 84. As shown in FIG. 6, the base header 80 includes a version field 86a, a number of individual bits/flags, collectively designated by a reference numeral 86b, a length field 86c, a metadata type field 86d, and a next protocol field 86e. The services header 82 includes a Service Path ID field 88a and a Service Index field 88b. The fields and their contents are described in detail in the aforementioned NSH IETF Draft. In some cases, NSH requires that the Service Index ("SI") must be decremented by the service functions. Also, in some cases, NSH requires that the FEs must forward NSH encapsulated traffic based Service Path ID ("SPI") and Service Index ("SI"), as received from other components. As described above, both the SPI and the SI, which are included in the service header of an NSH, are needed to make a forwarding decision. The control plane constructs the SPIs and distributes them into the forwarding elements along with SI and decrement value (i.e., the amount by which to decrement the SI). This implies that all service functions must have the knowledge of the SPIs and the SIs and in turn manipulate them prior to forwarding a NSH encapsulated packet out.

As previously noted, SFC involves steering user/application traffic through a list of ordered service functions before forwarding onward to its destination, in the process servicing the traffic as per policy in those service functions as well as service chaining infrastructure. Existing methods to forward traffic through service functions suffer from various deficiencies including but not limited to complexity of deployment and operation due a large number of forwarding touch points; scale challenges due to the involvement of service functions in making forwarding decisions; and violation of operational environment policies due to errors or unintentional modification of forwarding-state by service functions.

Moreover, as a consequence of above assertions of NSH and service chaining, NSH uses a model in which service functions are fully trusted to maintain the integrity of the encapsulation, thereby allowing forwarding elements or service function forwarders to forward on the decisions made by service functions. This is not acceptable in all network environments. Strict infrastructure and application boundaries in operators' environments essentially disallow such a method of packet forwarding. Additionally, since forwarding decisions are made at service functions, the control plane has to program the forwarding elements with forwarding information, which includes the SPI and SI information. This approach negatively impacts scalability, as the number of service functions are significantly greater in number as compared to forwarding elements in a typical deployment. Moreover, given that service functions have to be programmed with forwarding information and the service functions may be from any vendor or third party, programming the service functions and the infrastructure may lead to very complex control plane interactions, which in turn negatively impacts scalability of the deployment and hence the architecture. The service functions may be home-grown by the operators, purchased from third parties, or downloaded freely from open source software portals. Still further, since forwarding is performed at the forwarding elements based solely on the SPI and SI fields in the NSH encapsulation header, forwarding elements are vulnerable to decisions made by service functions. If a service function is buggy, compromised, or performing incorrect manipulation of the SI, packets may be forwarded to the wrong next-hop (such as jumping over a firewall) or may continuously loop. Finally, looking at the service context header in NSH, it is not possible to determine what service function the packet is associated with and where along the path it is, due to the fact that service functions decrement the SI. As a result, additional context is required to make such an assertion.

Original vPath implementation relies on a stateful method to contain the forwarding decision to forwarding elements. However stateful methods are not cost-effective to implement in hardware and almost never implemented at any reasonable scale.

To address some of these issues, in accordance with features of embodiments described herein, a technique for infrastructure-exclusive service forwarding may be employed in service chain architecture and packet forwarding methods to perform the actual packet forwarding through the service path in a network in an intuitive, effective, hardware friendly and architecturally clean manner. In particular, the infrastructure-exclusive service forwarding method described herein is stateless and hardware friendly, and advantageously limits forwarding state manipulation to forwarding elements (switches, routers, or other network elements). The method separates the service overlays into service-function and infrastructure overlays. Further, it contains forwarding decisions and SI manipulation to forwarding elements and free the service functions from making forwarding decisions and manipulating the SI.

The method separates forwarding and servicing planes in NSH or any such encapsulations. This enables forwarding to be fully owned and controlled by the service chaining infrastructure while service delivery is fully the responsibility of the service functions. This allows for scaling the service plane independent of the forwarding plane while avoiding forwarding conflicts that may otherwise arise. Forwarding is fully controlled by the forwarding elements and any forwarding-state carried in NSH, be it NSH service context header or metadata context header, is fully opaque to the service functions. The current overlay network can be separated into infrastructure overlay and the service overlay. Infrastructure overlay extends between forwarding elements or classifier and forwarding elements, while the service overlay extends between the forwarding elements and service functions. Only the forwarding elements and classifiers make the forwarding decisions, hence limiting the forwarding decision-making to infrastructure alone. In some embodiments, the decrement operation on SI at the forwarding elements may be controlled by the presence of a signal or a flag that indicates whether the packet is on the infrastructure or the service overlay/plane.

Figure 7:
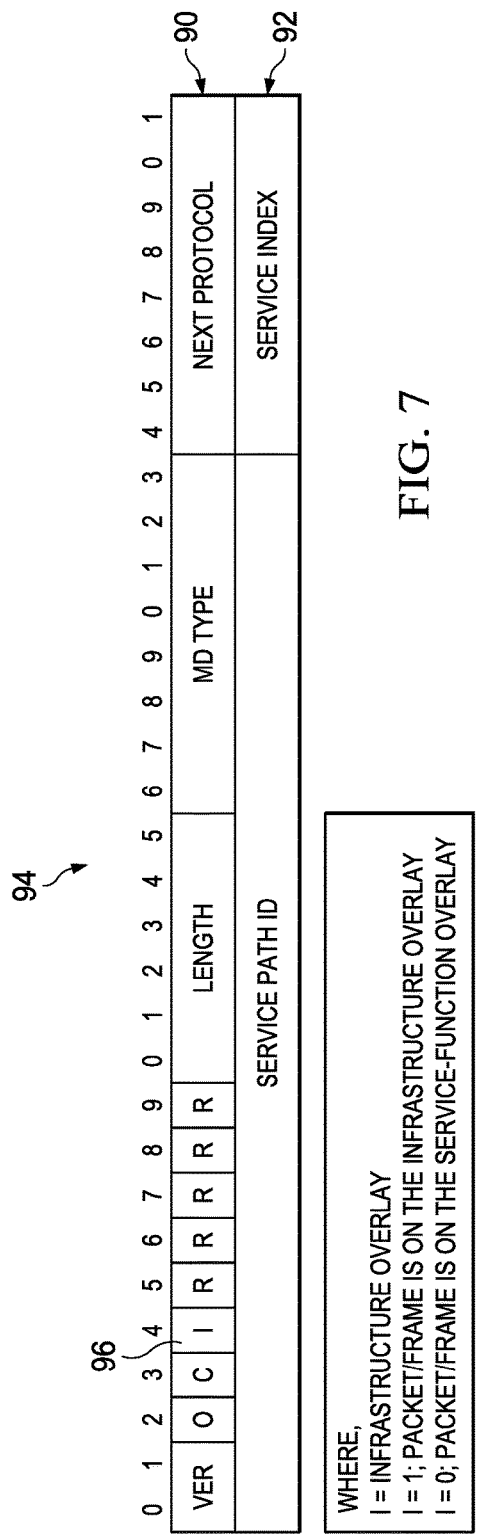
FIG. 7 illustrates a revised arrangement of base and service headers in accordance with embodiments described herein.
Figure 8:
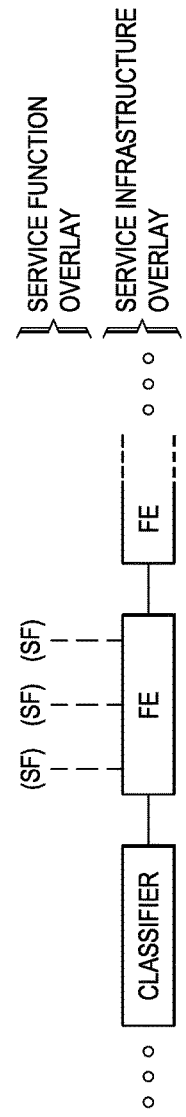
FIG. 8 illustrates a difference between a service function overlay and a service infrastructure overlay in accordance with embodiments described herein.

FIG. 7 is the format of a base header 90 and a service header 92 of a modified NSH 94 for implementing features of embodiments described herein. As shown in FIG. 7, one of the bits/flags of the base header 90 (designated in FIG. 7 by a reference numeral 96) is identified as an Infrastructure Overlay, or "I," bit or flag. In operation, as will be described in greater detail below, when the I bit is set to 1, the packet/frame is deemed to be on the service-infrastructure overlay; when the I bit is set to 0, the packet/frame is deemed to be on the service-function overlay. The "service infrastructure overlay" comprises communications between the classifier and a forwarding element or between forwarding elements. The "service function overlay" comprises communications between forwarding elements and service functions. This concept is illustrated in FIG. 8.

The following rules are observed by the SFC components in updating the 'I' flag and the SI field of the modified NSH 94 shown in FIG. 7:

1. a classifier must set an infrastruture ("I") flag in the NSH to 1 when sending an NSH encapsulated packet/frame to the next forwarding element or service function forwarder;
2. a forwarding element (or SFF) must set the I flag to 1 when sending an NSH encapsulated packet to the next forwarding element or service function forwarder;
3. a classifier and a forwarding element (SFF) must set the I flag to 0 in all other circumstances when forwarding an NSH encapsulated packet;
4. a service function or service function proxy must not set the I flag;
5. a forwarding element (or SFF) must update the service index in NSH only when a packet with NSH is received with the I flag set to 0 before making the next forwarding decision; and
6. a service function is never permitted to decrement or update the service index; this is controlled by a one-time static configuration at the service functions and is preferably the default behavior of the service functions.

It will be noted that in certain embodiments, classifiers are expected to have embedded therein a forwarding element (or service forwarding function) and to display all of the behaviors of a forwarding element.

Figure 9A:
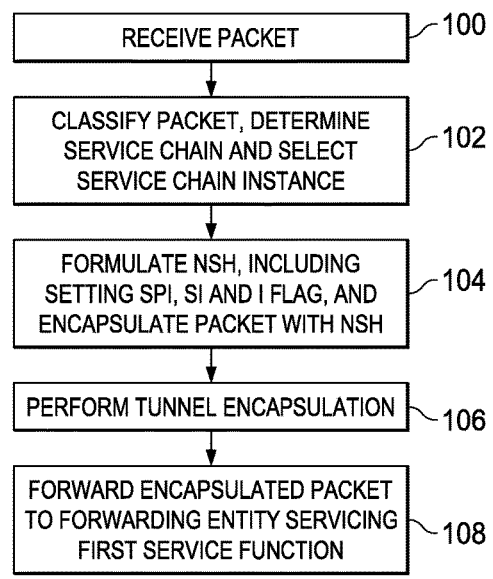
FIG. 9A illustrates a flowchart showing a method that may be implemented at an initial classifier function, such as the network element of FIG. 2A, in accordance with embodiments described herein.

FIG. 9A is a flowchart illustrating a method that may be implemented at an initial classifier function, such as network element 50 (FIG. 2), in accordance with embodiments described herein. In step 100, a packet is received. In step 102, the packet is classified. Additionally, the service chain is identified in accordance with policy and a service chain instance is selected. In step 104, the packet is encapsulated with an NSH, which includes setting the SPI and SI fields and setting the I flag. As previously noted, in accordance with features of embodiments described herein, the I flag will be set to 1 if the packet is to be forwarded to a forwarding element (SFF) and to 0 if the packet is to be forwarded to a service function. In step 106, tunnel encapsulation is performed. In step 108, the packet is forwarded on the service chain identified in the SPI to the service function identified in the SI, via the forwarding element anchoring the service function.

Figure 9B:
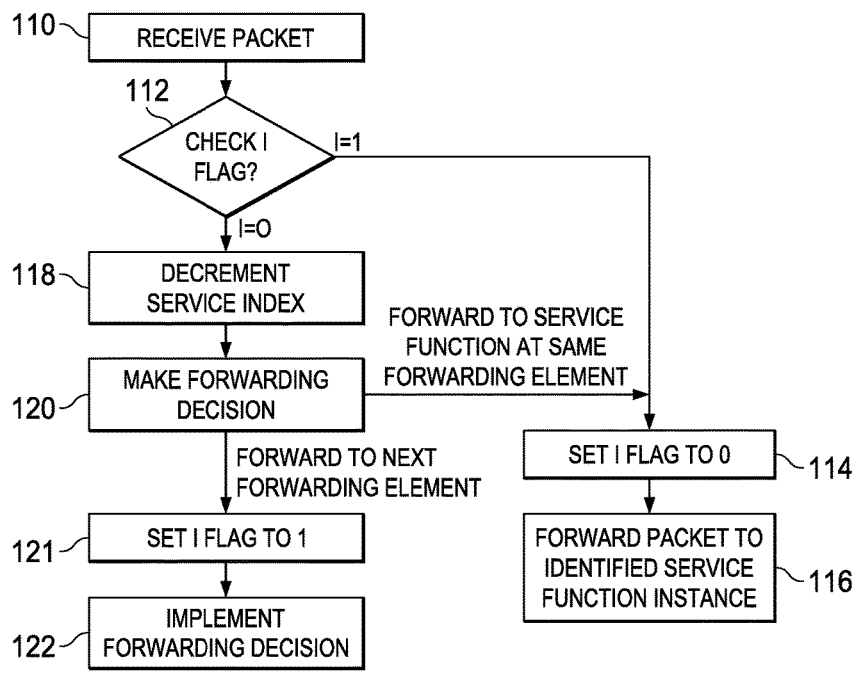
FIG. 9B illustrates a flowchart showing a method that may be implemented at a forwarding element, such as the network element of FIG. 2B, in accordance with embodiments described herein.

FIG. 9B is a flowchart illustrating a method that may be implemented at a forwarding element, such as network element 50 (FIG. 2), in accordance with embodiments described herein. In step 110, a packet is received. In step 112, the I flag of the NSH of the packet is checked. If the I flag is set to 1, meaning that the packet was received on the infrastructure overlay (e.g., from a classifier or forwarding element), execution proceeds to step 114, in which the I flag is set to 0, and then to step 116, in which the packet is forwarded to the identified service function via the service function overlay. If in step 112, the I flag is determined to be set to 0, meaning that the packet was received on the service function overlay (e.g., from a service function), in step 118, the SI is decremented (or updated). In step 120, a forwarding decision is made based on the new value of the SI. The forwarding decision may result in the packet being sent to a service node anchored at the same forwarding element, in which case execution proceeds to step 114 (described above), or may result in the packet being sent to a service node anchored at a different forwarding element, in which case execution proceeds to step 121. In step 121, the I flag is set to 1, and in step 122, the packet is forwarded via the infrastructure overlay in accordance with the forwarding decision made in step 120.

In certain embodiments, the forwarding element, or SFF, may verify the integrity of the service path header every time an NSH packet is received from a service function. This verification may be implemented as follows.

The separation of service function and forwarding function responsibilities with respect to forwarding state allows the service function forwarders to enforce integrity checks to verify the immutable aspect of the service path header. In certain embodiments, it is recommended to use an appropriate method to verity the integrity of the service path header. There are many approaches to performing the integrity checks; a few are briefly summarized below as examples.

In one embodiment, every NSH packet received from a SF (i.e., 1=0 in NSH base header) is checked against the three tuple: <SF-Transport-Address, SPI, SI> programmed in the SFF by the control plane for that SF. This method is simple and works well when a SF appears only once across all service paths.

In another embodiment, SFFs compute a hash of an n-tuple or a pseudo header and transport this hash as opaque metadata in NSH through the SFs on a service path. When an SFF receives the opaque metadata back (post servicing of the packet), it re-computes the hash of the same n-tuple and checks against the hash received in NSH. The n-tuple may include inner payload, outer transport, service path header and SFF local data among others. Implementations must determine the n-tuple based on the SFC deployment requirements.

In another embodiment, SFFs that are stateful use flow state to record SPI and SIs and validate the same when the packet is received back from a SF. This works well as long as an SF appears only once in a given SPI. If multiple instances of the same SF within the same SPI are needed, additional checks to protect the SI must be performed.

In yet another embodiment, as a generalized approach, the control plane programs a mask to be applied to the NSH header to select the bits against which to perform integrity checks. In the simplest case, the mask represents just the service path header.

The service header integrity check techniques described above do not protect against such threats as packet replay or spoofing attacks, which do not violate the integrity of the service path header; rather, they protect only against modification of the NSH service path header accidentally or otherwise thus ensuring the integrity of the same.

Figure 10:
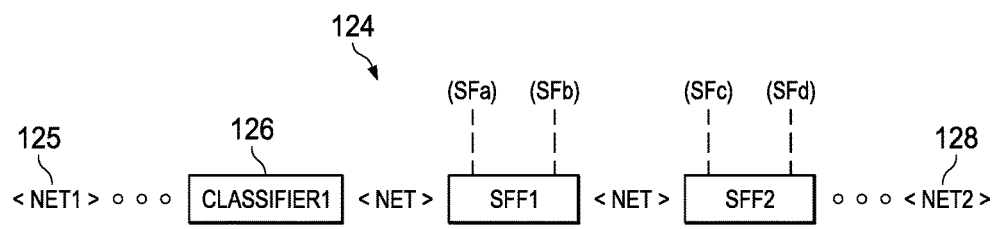
FIG. 10 is a system block diagram showing an example of a typical packet flow in accordance with embodiments described herein.

FIG. 10 illustrates an example of a typical packet flow through an example SPI1=SFa@SFF1,SFb@SFF1, SFc@SFF2 with the topology shown in FIG. 10. As shown in FIG. 10, a packet enters the system 124 via an SFC ingress network 125 reaching a classifier function 126. The classifier function 126 determines the SPI and SI of the packet as part of the classification. The classifier function 126 formulates the NSH infrastructure overlay packet, sets the I flag, among other header updates, and forwards the packet onward to SFF1. SFF1 receives the NSH infrastructure overlay packet, omits performing the SI decrement operation due to I=1, performs a forwarding lookup to determine the next hop. SFF1 determines SFa as the next hop, formulates the NSH service overlay packet, clears the I flag among other header updates, and forward the packet to SFa on service function overlay. SFa services the packet by consuming and/or producing metadata and forwards the packet back to SFF1. Upon receipt by SFF1 of the returned packet, SFF1 decrements the SI, due to I=0, before performing a forwarding lookup. SFF1 determines the next-hop as SFb and the process repeats with SFb as before with SFa. SFF1 receives the SFb serviced packet, decrements the SI and determines the next-hop to be SFc and forwards the packet to SFF2 on the infrastructure overlay (I=1). SFF2 repeats the process with respect to SFc similarly. SFF2 receives the SFc serviced packet, decrements the SI and determines SPI1 is fully executed and proceeds with forwarding on an SFC egress network 128.

Figure 11:
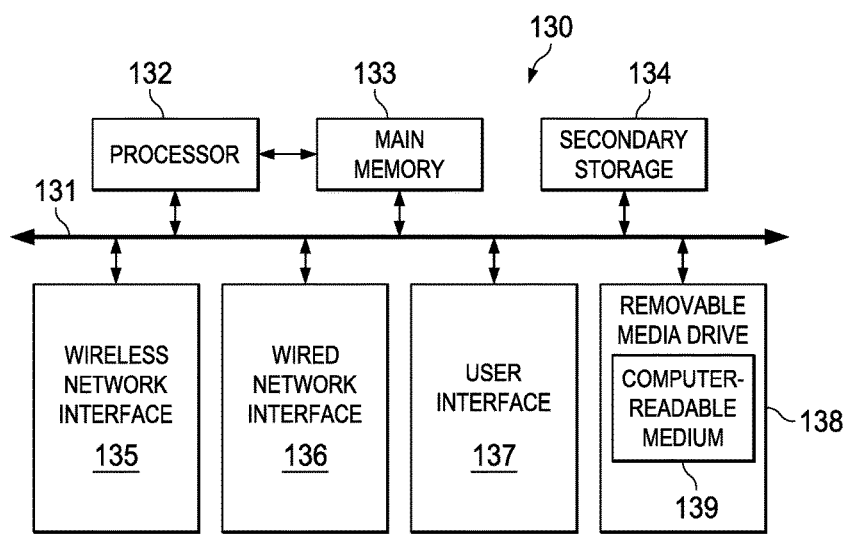
FIG. 11 is a simplified block diagram of a machine comprising an element of a communications network in which techniques for infrastructure-exclusive service forwarding in accordance with embodiments described herein may be implemented.

Turning to FIG. 11, FIG. 11 illustrates a simplified block diagram of an example machine (or apparatus) 130, which in certain embodiments may be a classifier or a forwarding element, that may be implemented in embodiments described herein. The example machine 130 corresponds to network elements and computing devices that may be deployed in a communications network, such as a classifier or a forwarding element. In particular, FIG. 11 illustrates a block diagram representation of an example form of a machine within which software and hardware cause machine 130 to perform any one or more of the activities or operations discussed herein. As shown in FIG. 11, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 11 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc.

Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, classifier and forwarding elements, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 133, secondary storage 134, computer-readable medium 139) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 132) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Certain embodiments described herein separate the overlay in service function chaining into an infrastructure overlay and a service function overlay, allowing additional security policies to be enforced between the two. Certain embodiments described herein provide a stateless, hardware friendly method for decrementing the NSH service index without requiring any state at the forwarding element or sender awareness. Additionally, certain embodiments described herein restrict the forwarding decisions (in updating the service index) to the forwarding elements alone and frees the service functions to focus purely on service delivery and avoid dealing with complexities associated with forwarding decisions. Still further, certain embodiments described herein enable the service chaining control plane to scale independently of the number of service functions and prevent issues that may arise due to incorrect manipulation of the service index by limiting manipulation of the service index to forwarding elements.

Certain embodiments described herein allow snooping tools or any type of intermediate nodes to clearly determine whether the NSH encapsulated packet is going between forwarding elements or between a forwarding element and a service function without relying on the source and destination locators, which is useful in tracing and debugging, especially in cloud deployments. Certain embodiments described herein allow the service index on an NSH packet to be always associated with the service function as indicated by the service index whether the packet is in transit from a forwarding element to the service function or from the service function to a forwarding element.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving at a network element a packet including a Network Services Header ("NSH"), wherein the NSH includes an Infrastructure ("I") flag and a service path header comprising a Service Index ("SI"), and a Service Path ID ("SPI");
   determining whether the I flag is set to a first value;
   if the I flag is set to the first value:
      setting the I flag to a second value; and
      forwarding the packet to a service function that corresponds to the SI for processing;
   if the I flag is not set to the first value:
   decrementing the SI; and
   making a forwarding decision based on a new value of the SI and the SPI;
   wherein the I flag will be set to the first value when the packet is to be forwarded to a forwarding element and to the second value when the packet is to be forwarded to the service function.

2. The method of claim 1 further comprising, if the forwarding decision comprises forwarding the packet to a second service function anchored to the network element:
   setting the I flag to the second value; and
   forwarding the packet to the second service function anchored to the network element.

3. The method of claim 1 further comprising, if the forwarding decision comprises forwarding the packet to a second service function anchored at a different network element:
   setting the I flag to the first value; and
   forwarding the packet to the different network element.

4. The method of claim 1, wherein the network element comprises at least one of a forwarding element and a classifier.

5. The method of claim 1 further comprising performing an integrity check on the service header upon receipt of the packet from the service function.

6. The method of claim 5, wherein the integrity check comprises at least one of:
   checking the packet against a three tuple programmed into the network element by a control plane for the service function;
   computing a hash of an n-tuple or pseudo header and transporting the hash as opaque metadata in the NSH through the service function on a service path;
   recording the SPI and the SI and validating them when the packet is received from the service function; and
   applying a mask programmed by the control plane to the NSH to select bits against which to perform integrity checks.

7. The method claim 1, wherein the NSH includes a decrement value and wherein the decrementing comprises reducing the value of the SI by an amount equal to the decrement value.

8. The method of claim 1, wherein the service function does not alter the service path header.

9. The method of claim 1 further comprising:
   receiving at the network element a second packet, wherein the second packet does not include an NSH;
   classifying the second packet at the network element to select a service chain for processing the second packet;
   adding to the second packet an NSH, wherein a service header of the NSH added to the second packet identifies the service chain;
   setting an I bit of the NSH header added to the second packet to 1; and
   making a forwarding decision based on the service chain of the NSH header added to the second packet.

10. One or more non-transitory tangible media having encoded thereon logic that includes code for execution and when executed by a processor is operable to perform operations comprising:
    receiving at a network element a packet including a Network Services Header ("NSH"), wherein the NSH includes an Infrastructure ("I") flag and a service path header comprising a Service Index ("SI"), and a Service Path ID ("SPI");
    determining whether the I flag is set to a first value;
    if the I flag is set to the first value:
       setting the I flag to a second value; and
       forwarding the packet to a service function that corresponds to the SI for processing;
    if the I flag is not set to the first value:
       decrementing the SI; and
       making a forwarding decision based on a new value of the SI and the SPI;
    wherein the I flag will be set to the first value when the packet is to be forwarded to a forwarding element and to the second value when the packet is to be forwarded to a service function.

11. The media of claim 10 wherein the operations further comprise, if the forwarding decision comprises forwarding the packet to a second service function anchored to the network element:
    setting the I flag to the second value; and
    forwarding the packet to the second service function anchored to the network element.

12. The media of claim 10 wherein the operations further comprise, if the forwarding decision comprises forwarding the packet to a second service function anchored at a different network element:
    setting the I flag to the first value; and
    forwarding the packet to the different network element.

13. The media of claim 10 wherein the operations further comprise performing an integrity check on the service header upon receipt of the packet from the service function, wherein the integrity check comprises at least one of:
    checking the packet against a three tuple programmed into the network element by a control plane for the service function;
    computing a hash of an n-tuple or pseudo header and transporting the hash as opaque metadata in the NSH through the service function on a service path;
    recording the SPI and the SI and validating them when the packet is received from the service function; and
    applying a mask programmed by the control plane to the NSH to select bits against which to perform integrity checks.

14. The media of claim 10, wherein the service function does not alter the service path header.

15. The media of claim 10 wherein the instructions further comprise:
    receiving at the network element a second packet, wherein the second packet does not include an NSH;
    classifying the second packet at the network element to select a service chain for processing the second packet;
    adding to the second packet an NSH, wherein a service header of the NSH added to the second packet identifies the service chain;
    setting an I bit of the NSH header added to the second packet to 1; and making a forwarding decision based on the service chain of the NSH header added to the second packet.

16. An apparatus comprising:
a memory element configured to store data;
a processor operable to execute instructions associated with the data; and
a service forwarding function module configured to:
receive at a network element a packet including a Network Services Header ("NSH"), wherein the NSH includes an Infrastructure ("I") flag and a service path header comprising a Service Index ("SI"), and a Service Path ID ("SPI");
determine whether the I flag is set to a first value;
if the I flag is set to the first value:
set the I flag to a second value; and
forward the packet to a service function that corresponds to the SI for processing;
if the I flag is not set to the first value:
decrement the SI; and
make a forwarding decision based on a new value of the SI and the SPI;
wherein the I flag will be set to the first value when the packet is to be forwarded to a forwarding element and to the second value when the packet is to be forwarded to a service function.

17. The apparatus of claim 16, wherein the service forwarding function module is further configured to:
if the forwarding decision comprises forwarding the packet to a second service function anchored to the network element:
set the I flag to the second value; and
forward the packet to the second service function anchored to the network element; and
if the forwarding decision comprises forwarding the packet to a second service function anchored at a different network element:
set the I flag to the first value; and
forward the packet to the different network element.

18. The apparatus of claim 16, wherein the service forwarding function module is further configured to, perform an integrity check on the service header upon receipt of the packet from the service function, wherein the integrity check comprises at least one of:
checking the packet against a three tuple programmed into the network element by a control plane for the service function;
computing a hash of an n-tuple or pseudo header and transporting the hash as opaque metadata in the NSH through the service function on a service path;
recording the SPI and the SI and validating them when the packet is received from the service function; and
applying a mask programmed by the control plane to the NSH to select bits against which to perform integrity checks.

19. The apparatus of claim 16, wherein the service function does not alter the service path header.

20. The apparatus of claim 16, wherein the service forwarding module is further configured to:
receive at the network element a second packet, wherein the second packet does not include an NSH;
classify the second packet at the network element to select a service chain for processing the second packet;
add to the second packet an NSH, wherein a service header of the NSH added to the second packet identifies the service chain;
set an I bit of the NSH header added to the second packet to 1; and
make a forwarding decision based on the service chain of the NSH header added to the second packet.

* * * * *